(12) United States Patent
Watanabe et al.

(10) Patent No.: US 9,895,974 B2
(45) Date of Patent: Feb. 20, 2018

(54) VEHICLE CONTROL APPARATUS

(71) Applicant: AISIN SEIKI KABUSHIKI KAISHA, Kariya-shi, Aichi-ken (JP)

(72) Inventors: Kazuya Watanabe, Anjo (JP); Tetsuya Maruoka, Okazaki (JP); Itsuko Ohashi, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 14/835,926

(22) Filed: Aug. 26, 2015

(65) Prior Publication Data

US 2016/0059700 A1   Mar. 3, 2016

(30) Foreign Application Priority Data

Aug. 29, 2014   (JP) ................................. 2014-176069

(51) Int. Cl.
*B60K 35/00*   (2006.01)
*G06T 11/00*   (2006.01)
(Continued)

(52) U.S. Cl.
CPC ................ *B60K 35/00* (2013.01); *G06T 3/60* (2013.01); *G06T 11/001* (2013.01);
(Continued)

(58) Field of Classification Search
CPC ........ B60R 2300/105; B60R 2300/305; B60R 2300/102; B60R 2300/301;
(Continued)

(56) References Cited

U.S. PATENT DOCUMENTS 6,985,171 B1 * 1/2006 Kuriya ...................... B60R 1/00
340/435
7,421,094 B2 * 9/2008 Ikeda ...................... G08G 1/167
348/119
(Continued)

FOREIGN PATENT DOCUMENTS

EP   2963922 A1   1/2016
JP   9-52555 A   2/1997
(Continued)

OTHER PUBLICATIONS

Communication dated Jan. 27, 2016 from the European Patent Office issued in corresponding Application No. 15181204.7.

*Primary Examiner* — Michael Osinski
(74) *Attorney, Agent, or Firm* — Sughrue Mion, PLLC

(57) ABSTRACT

A vehicle control apparatus includes a first acquisition portion acquiring a captured image data outputted from an imaging portion that is provided at a vehicle and that images a surrounding of the vehicle, a second acquisition portion acquiring an inclination angle of the vehicle on a basis of a state information of the vehicle, the state information outputted from a vehicle state detection portion that is provided at the vehicle, and an output portion being configured to output an output image data to a display device, the output image data including the captured image data and an inclination angle display information indicating the inclination angle of the vehicle, the output portion changing a display method within the output image data in accordance with the inclination angle of the vehicle and outputting the output image data.

15 Claims, 10 Drawing Sheets

(51) Int. Cl.
  *G06T 3/60* (2006.01)
  *B60R 1/12* (2006.01)
  *H04N 5/232* (2006.01)

(52) U.S. Cl.
  CPC ... *H04N 5/23293* (2013.01); *B60K 2350/352* (2013.01); *B60R 2001/1215* (2013.01); *B60R 2300/30* (2013.01); *B60R 2300/605* (2013.01)

(58) Field of Classification Search
  CPC ...... B60R 2300/8086; B60R 2300/207; B60R 2300/302; B60R 2300/303; B60R 2300/306; G08G 1/167; G08G 1/16; G08G 1/165; G08G 1/166; G06K 9/00791; G06K 9/00798; G06K 9/00805; H04N 7/181; H04N 7/18; H04N 5/23293; B60K 2350/2013; B60K 2350/2056; B60K 35/00; B60K 2350/352; B60W 2520/14–2520/18; G06T 2207/30252; G06T 11/001
  See application file for complete search history.

(56) References Cited

U.S. PATENT DOCUMENTS

| | | | | |
|---|---|---|---|---|
| 8,212,662 | B2* | 7/2012 | Sasaki | G01B 21/22 340/438 |
| 8,810,653 | B2* | 8/2014 | Nagaoka | G06K 9/00369 348/148 |
| 9,134,132 | B2* | 9/2015 | Kim | B62D 41/00 |
| 9,247,217 | B2* | 1/2016 | Okuyama | B60R 1/00 |
| 9,275,287 | B2* | 3/2016 | Watanabe | B60R 1/00 |
| 2002/0055808 | A1* | 5/2002 | Matsumoto | G01C 21/365 701/1 |
| 2003/0080877 | A1* | 5/2003 | Takagi | B60R 1/00 340/932.2 |
| 2003/0090570 | A1* | 5/2003 | Takagi | B60R 1/00 348/148 |
| 2006/0176210 | A1* | 8/2006 | Nakamura | B60R 1/00 342/45 |
| 2008/0013790 | A1* | 1/2008 | Ihara | B60W 40/109 382/104 |
| 2008/0027627 | A1* | 1/2008 | Ikeda | G06K 9/00798 701/117 |
| 2008/0143833 | A1* | 6/2008 | Yanai | B60R 1/00 348/148 |
| 2009/0059005 | A1* | 3/2009 | Hattori | B60R 1/00 348/148 |
| 2010/0066518 | A1* | 3/2010 | Ohshima | B60R 1/00 340/435 |
| 2012/0026333 | A1* | 2/2012 | Okuyama | B60R 1/00 348/148 |
| 2012/0182426 | A1* | 7/2012 | Fukuda | G06T 7/0042 348/148 |
| 2012/0249794 | A1* | 10/2012 | Kiyo | B60R 1/00 348/148 |
| 2012/0269382 | A1* | 10/2012 | Kiyohara | G01C 21/26 382/103 |
| 2012/0287282 | A1* | 11/2012 | Kinoshita | B60R 1/00 348/148 |
| 2012/0320213 | A1* | 12/2012 | Ikeda | B60R 1/00 348/148 |
| 2013/0250097 | A1* | 9/2013 | Choi | G01C 21/36 348/116 |
| 2013/0321634 | A1* | 12/2013 | Okano | B60R 1/00 348/148 |
| 2014/0085466 | A1* | 3/2014 | Moriyama | G08G 1/165 348/148 |
| 2014/0092237 | A1* | 4/2014 | Watanabe | B60R 1/00 348/118 |
| 2015/0070157 | A1* | 3/2015 | Murayama | B60K 35/00 340/435 |
| 2015/0203035 | A1 | 7/2015 | Watanabe | |
| 2015/0317834 | A1* | 11/2015 | Poulos | G06F 3/012 345/619 |
| 2015/0343951 | A1* | 12/2015 | Kim | B60R 1/00 701/42 |
| 2015/0375680 | A1 | 12/2015 | Watanabe et al. | |
| 2016/0129836 | A1* | 5/2016 | Sugita | B60K 35/00 701/41 |
| 2016/0182863 | A1* | 6/2016 | Watanabe | H04N 7/181 348/148 |

FOREIGN PATENT DOCUMENTS

| | | |
|---|---|---|
| JP | 2009-212703 A | 9/2009 |
| JP | 2013-210225 A | 10/2013 |
| WO | 2014/050388 A1 | 4/2014 |
| WO | 2015/174208 A1 | 11/2015 |

* cited by examiner

VEHICLE CONTROL APPARATUS

CROSS REFERENCE TO RELATED APPLICATIONS

This application is based on and claims priority under 35 U.S.C. §119 to Japanese Patent Application 2014-176069, filed on Aug. 29, 2014, the entire content of which is incorporated herein by reference.

TECHNICAL FIELD

This disclosure generally relates to a vehicle control apparatus.

BACKGROUND DISCUSSION

A known technology for supporting parking of a vehicle is disclosed in JP2013-210225A (hereinafter referred to as Patent reference 1). According to the technology disclosed in Patent reference 1, a driver receives an image data captured by plural cameras mounted on the vehicle, the image data captured as surroundings of the vehicle. Patent reference 1 further offers a technology that warns the driver in accordance with an inclination of the vehicle.

However, according to the technology disclosed in Patent reference 1, the driver may not recognize the inclination of the vehicle by watching only the image data captured by a camera mounted on the vehicle. Further, because the warning in accordance with the inclination of the vehicle is performed at a predetermined timing, it is difficult for the driver to recognize the inclination of the vehicle at other timing than the predetermined timing.

A need thus exists for a vehicle control apparatus which is not susceptible to the drawback mentioned above.

SUMMARY

According to an aspect of this disclosure, a vehicle control apparatus includes a first acquisition portion acquiring a captured image data outputted from an imaging portion that is provided at a vehicle and that images a surrounding of the vehicle, a second acquisition portion acquiring an inclination angle of the vehicle on a basis of a state information of the vehicle, the state information outputted from a vehicle state detection portion that is provided at the vehicle, and an output portion being configured to output an output image data to a display device, the output image data including the captured image data and an inclination angle display information indicating the inclination angle of the vehicle, the output portion changing a display method within the output image data in accordance with the inclination angle of the vehicle and outputting the output image data.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
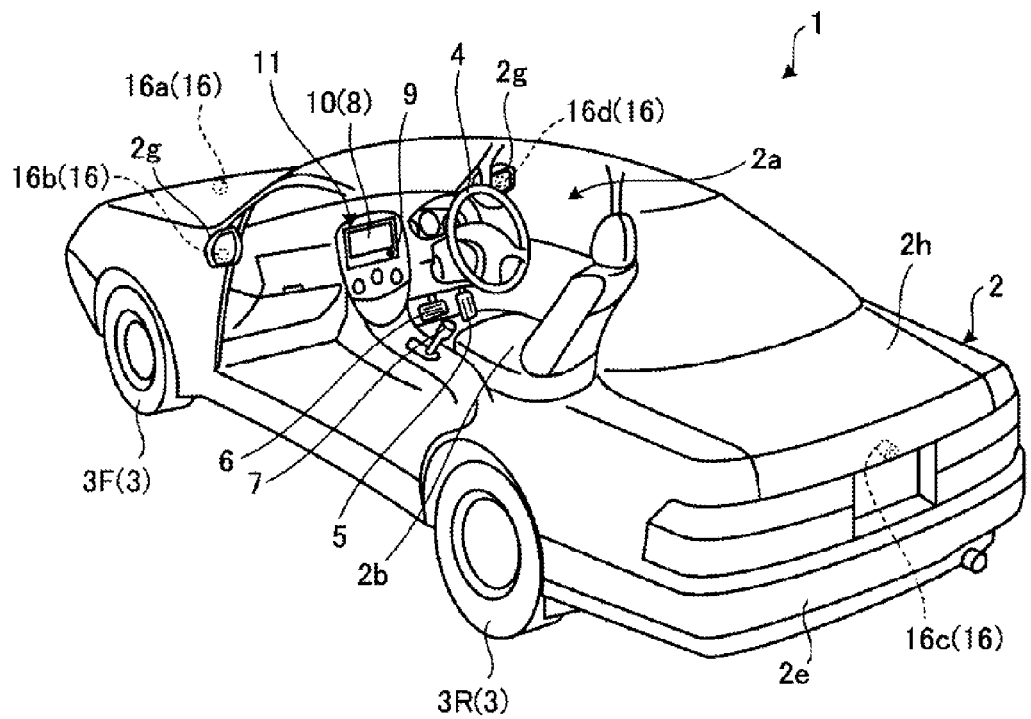
FIG. 1 is a perspective view illustrating an example of a state where a portion of an interior of a vehicle according to an embodiment is viewed in a perspective manner.

The following embodiment and modified examples include the similar components to one another. Thus, the similar components bear the common reference numerals. In addition, duplicated explanation is omitted.

In the embodiment, a vehicle 1 may be a car (internal combustion car) including an internal combustion engine as a driving source, a car (an electric car and a fuel cell car, or the like) including an electric motor as the driving source, or a car (a hybrid car) including the engine and the motor as the driving sources, for example. In addition, the vehicle 1 may include various kinds of transmissions and various kinds of apparatuses (systems. Parts and the like) desired for driving the internal combustion engine or the electric motor. Further, method, quantity, layout and the like of an apparatus related to driving of wheels 3 of the vehicle 1 may be variously specified.

As illustrated in FIG. 1, a vehicle body 2 forms a vehicle interior 2*a* where a passenger gets in. For example, a steering portion 4, an acceleration operating portion 5, a braking operating portion 6, a speed change operating portion 7 and the like are provided within the vehicle interior 2*a* in a state facing a seat 2b of a driver as the passenger. In the embodiment, as an example, the steering portion 4 is a steering wheel projecting from a dashboard (instrument panel) and the acceleration operating portion 5 is an accelerator pedal positioned at the feet of the driver. The braking operating portion 6 is a brake pedal positioned at the feet of the driver and the speed change operating portion 7 is a shift lever projecting from a center console. Nevertheless, the steering portion 4, the acceleration operating portion 5, the braking operating portion 6 and the speed change operating portion 7 are not limited to the aforementioned members.

In addition, a display device 8 (display output portion) and an audio output device 9 (audio output portion) are provided within the vehicle interior 2a. The display device 8 is, for example, a LCD (liquid crystal display), an OELD (organic electroluminescent display) and the like. The audio output device 9 is, as an example, a speaker. In the embodiment, the display device 8 is covered by a clear operation input portion 10 (for example, a touch panel and the like), for example. The passenger and the like may visually confirm a projected image (image) on a display screen of the display device 8 via the operation input portion 10. The passenger and the like may perform an operation input (instruction input) by operating the operation input portion 10, i.e., touching, pressing or moving the operation input portion 10 with one's finger at a position corresponding to the projected image (image) displayed on the display screen of the display device 8. In the embodiment, as an example, the display device 8, the audio output device 9, the operation input portion 10 and the like are provided at a monitor device 11 positioned at a center portion of the dashboard in a vehicle width direction (right-left direction). The monitor device 11 may include an operation input portion such as a switch, a dial, a joy-stick and a pressing button, for example. An audio output device may be provided at other position within the vehicle interior 2a, i.e., position different from the monitor device 11. In addition, sound may be output from other audio output device than the audio output device 9 of the monitor device 11. In the embodiment, as an example, the monitor device 11 is shared by a navigation system and an audio system. Alternatively, a monitor device of a surroundings monitoring apparatus may be separately provided from the aforementioned systems. It may be configured that, in addition to the audio output device 9, a warning sound and the like may be output from an audio output portion such as a buzzer 24 (refer to FIG. 3), for example.

Figure 2:
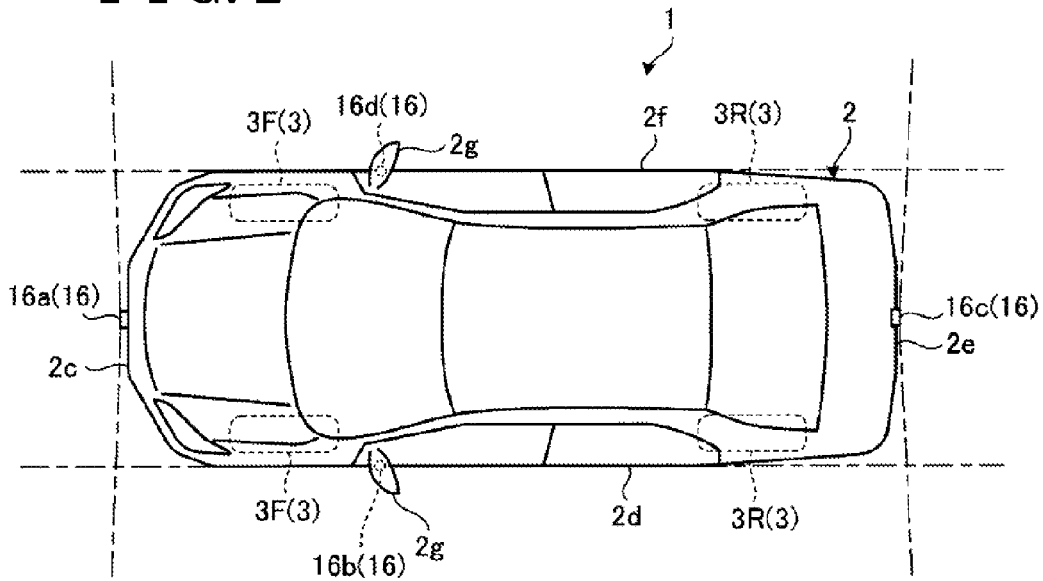
FIG. 2 is a plan view (bird's eye view) illustrating an example of the vehicle according to the embodiment.
Figure 3:
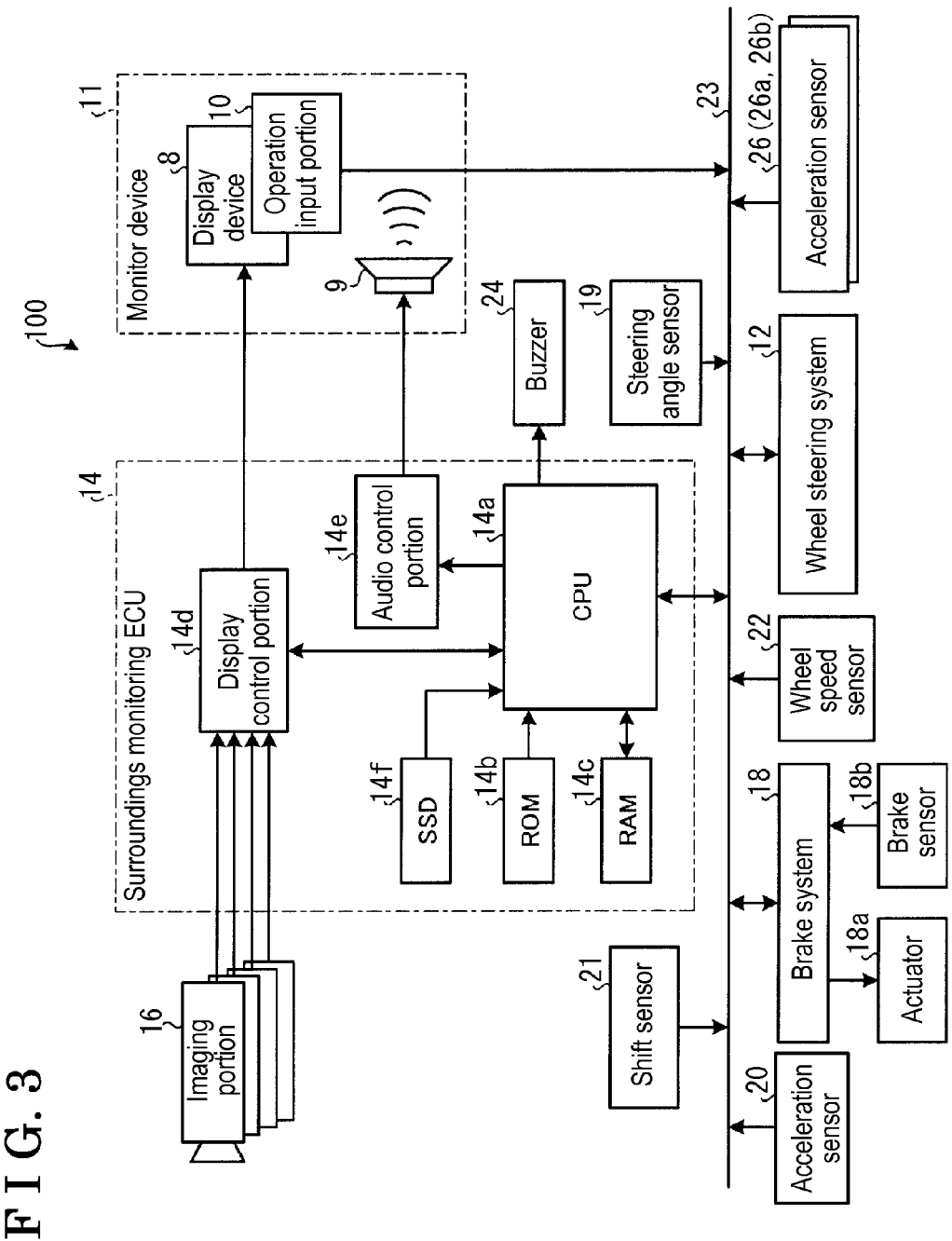
FIG. 3 is a block diagram illustrating an example of a surroundings monitoring system of the vehicle according to the embodiment.

As illustrated in FIGS. 1 and 2, in the embodiment, the vehicle 1 is a four-wheel vehicle (four-wheel car) as an example. The vehicle 1 includes two right and left front wheels 3F and two right and left rear wheels 3R. Further, in the embodiment, these four wheels 3 are configured to be steered (steerable). Specifically, as illustrated in FIG. 3, the vehicle 1 includes a wheel steering system 12 steering the front wheels 3F or the rear wheels 3R. The wheel steering system 12 may steer the front wheels 3F and the rear wheels 3R simultaneously, or at the same time.

In the embodiment, as an example, plural (in the embodiment, four, as an example) imaging portions 16 (16a, 16b, 16c, 16d) are provided at the vehicle 1 (vehicle body 2) as illustrated in FIG. 2. Each of the imaging portions 16 is, for example, a digital camera incorporating an imaging element such as a CCD (charge coupled device), a CIS (CMOS image sensor) and the like. The imaging portions 16 may output image data (moving image data, frame data) at a predetermined frame rate. Each of the imaging portions 16 includes a wide-angle lens to thereby take a picture in a range from, for example, 140 degrees to 220 degrees in a lateral direction or in a horizontal direction (view angle). An optical axis of the imaging portion 16 is specified to face downward (obliquely downward). Thus, the imaging portion 16 takes a picture of outside environment around the vehicle body 2 including a road surface on which the vehicle 1 is movable.

In the above, the lateral direction is a direction included in a lateral plane orthogonal to a direction of gravity (vertical direction).

In the embodiment, as an example, the imaging portion 16a is positioned at an end portion 2c (an end portion in a plan view) at a front side (a front side in a vehicle front-rear direction) of the vehicle body 2 and is provided at a front bumper, for example. The imaging portion 16b is positioned at an end portion 2d at a left side (a left side in a vehicle width direction) of the vehicle body 2 and is provided at a door mirror 2g (projecting portion) at a left side. The imaging portion 16c is positioned at an end portion 2e at a rear side (a rear side in the vehicle front-rear direction) of the vehicle body 2 and is provided at a wall portion at a lower side of a door 2h of a rear trunk. The imaging portion 16d is positioned at an end portion 2f at a right side (a right side in the vehicle width direction) of the vehicle body 2 and is provided at a door mirror 2g (projecting portion) at a right side. In the embodiment, the method of mounting the camera at the vehicle is not limited and the camera may be mounted so that the image data in a front direction, the image data in right and left side directions and the image data in a rear direction relative to the vehicle is obtainable.

The surroundings monitoring ECU 14 performs a calculation processing and an image processing based on the image data obtained by the plural imaging portions 16. The surroundings monitoring ECU 14 generates a wider view angle image and a virtual bird's eye view image (planar image) where the vehicle 1 (vehicle body 2) is viewed from an upper side.

In the embodiment, as an example, in a surroundings monitoring system 100 as illustrated in FIG. 3, a brake system 18, a steering angle sensor 19 (angular sensor), an accelerator sensor 20, a shift sensor 21, a wheel speed sensor 22, an acceleration sensor 26 (i.e., serving as a vehicle state detection portion), and the like are electrically connected, in addition to the surroundings monitoring ECU 14, the monitor device 11, the front wheel steering system 12, the rear wheel steering system 13, and the like, via an in-vehicle network 23 (electric telecommunication line). The in-vehicle network 23 is configured as a CAN (controller area network) as an example. The surroundings monitoring ECU 14 may send a control signal via the in-vehicle network 23 to control the front wheel steering system 12, the rear wheel steering system 13, the brake system 18, and the like. The surroundings monitoring ECU 14 may also receive detection results of a torque sensor 12b, a tire angle sensor 13b (for the rear wheels 3R), an actuator 18a, a brake sensor 18b, the steering angle sensor 19 (for the front wheels 3F), the accelerator sensor 20, the shift sensor 21, the wheel speed sensor 22, the acceleration sensor 26, and the like and indicator signals (control signals, operation signals, input signals, data) of the operation input portion 10 and the like via the in-vehicle network 23.

In the embodiment, the two acceleration sensors 26 (26a, 26b) are provided at the vehicle 1. In the embodiment, the vehicle 1 is equipped with an ESC (electronic stability control). Then, the acceleration sensors 26 (26a, 26b) as conventionally mounted to the vehicle equipped with the ESC (electronic stability control) are employed. In the embodiment, no restriction is made on the acceleration sensor. The sensor that detects the acceleration in the right-left direction of the vehicle 1 is acceptable.

Figure 4:
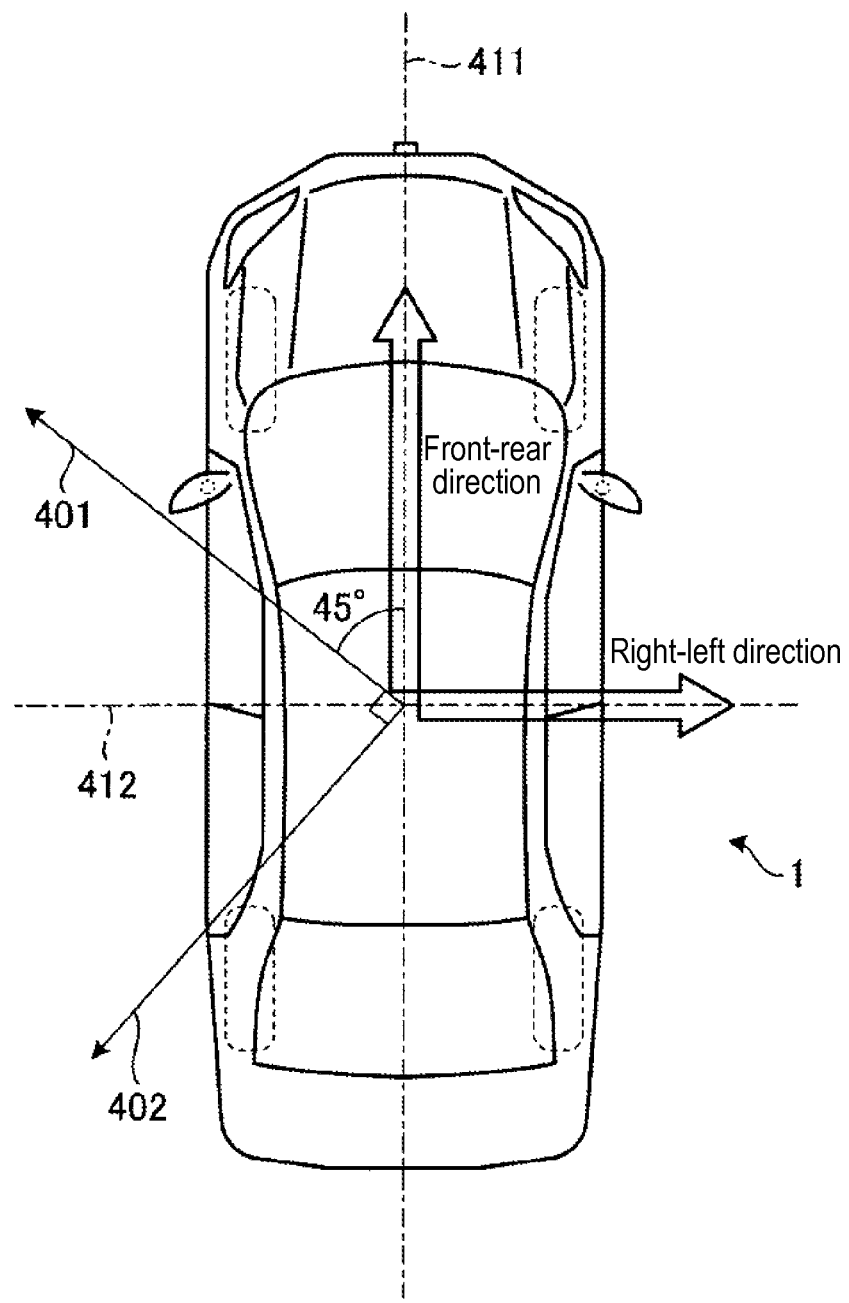
FIG. 4 is a view illustrating an example of a detection direction of an acceleration sensor according to the embodiment.

FIG. 4 is a diagram illustrating an example of detection directions of the acceleration sensors 26*a*, 26*b*. A detection direction 401 is the detection direction of the acceleration sensor 26*a* while a detection direction 402 is the detection direction of the acceleration sensor 26*b*. The detection direction 401 illustrated in FIG. 4 corresponds to a direction inclined by 45 degrees from a travelling direction (front-rear direction) of the vehicle 1 on a plane in parallel with a ground (a plane on which the vehicle 1 is movable). The detection direction 402 forms an angle of 90 degrees relative to the detection direction 401 on the plane in parallel with the ground. Because the two different detection directions are provided on the plane in parallel with the ground, the acceleration in the front-rear direction and the acceleration in the right-left direction may be obtained. In the embodiment, no restriction is made on the detection direction and at least the acceleration in the right-left direction may be obtained. Calculations of the acceleration in the front-rear direction and the acceleration in the right-left direction are made at the surroundings monitoring ECU 14.

The front-rear direction of the vehicle 1 indicates the travelling direction and an opposite direction from the travelling direction of the vehicle 1. The right-left direction of the vehicle 1 is a direction included in a surface orthogonal to the travelling direction of the vehicle 1.

Back to FIG. 3, the surroundings monitoring ECU 14 includes, as an example, a CPU 14*a* (central processing unit), a ROM 14*b* (read only memory), a RAM 14*c* (random access memory), a display control portion 14*d*, an audio control portion 14*e*, a SSD 14*f* (solid state drive, flush memory), and the like. The CPU 14*a* performs the image processing related to the image displayed at the display device 8 and the various calculation processing such as calculation of a moving path of the vehicle 1 and determination of whether or not interference with an object occurs, for example. The CPU 14*a* reads out program stored (installed) at a nonvolatile memory device such as the ROM 14*b*, for example, and performs the calculation processing based on the aforementioned program.

The RAM 14*c* temporarily stores various data used for the calculations at the CPU 14*a*. The display control portion 14*d* mainly performs the image processing using the image data obtained at the imaging portions 16 and the image processing (composition and the like, as an example) of the image data displayed at the display device 8, for example, within the calculation processing at the surroundings monitoring ECU 14. In addition, the audio control portion 14*e* mainly performs processing of audio data output at the audio output device 9 within the calculation processing at the surroundings monitoring ECU 14. The SSD 14*f* is a rewritable nonvolatile memory portion that stores data even in a case where a power source of the surroundings monitoring ECU 14 is turned off. The CPU 14*a*, the ROM 14*b*, the RAM 14*c* and the like may be integrated within the same package. The surroundings monitoring ECU 14 may be configured to include other logic operation processor such as a DSP (digital signal processor) or a logic circuit, for example, than the CPU 14*a*. In addition, instead of the SSD 14*f*, a HDD (hard disk drive) may be provided. Further, the SSD 14*f* or the HDD may be provided separately from the surroundings monitoring ECU 14.

Figure 5:
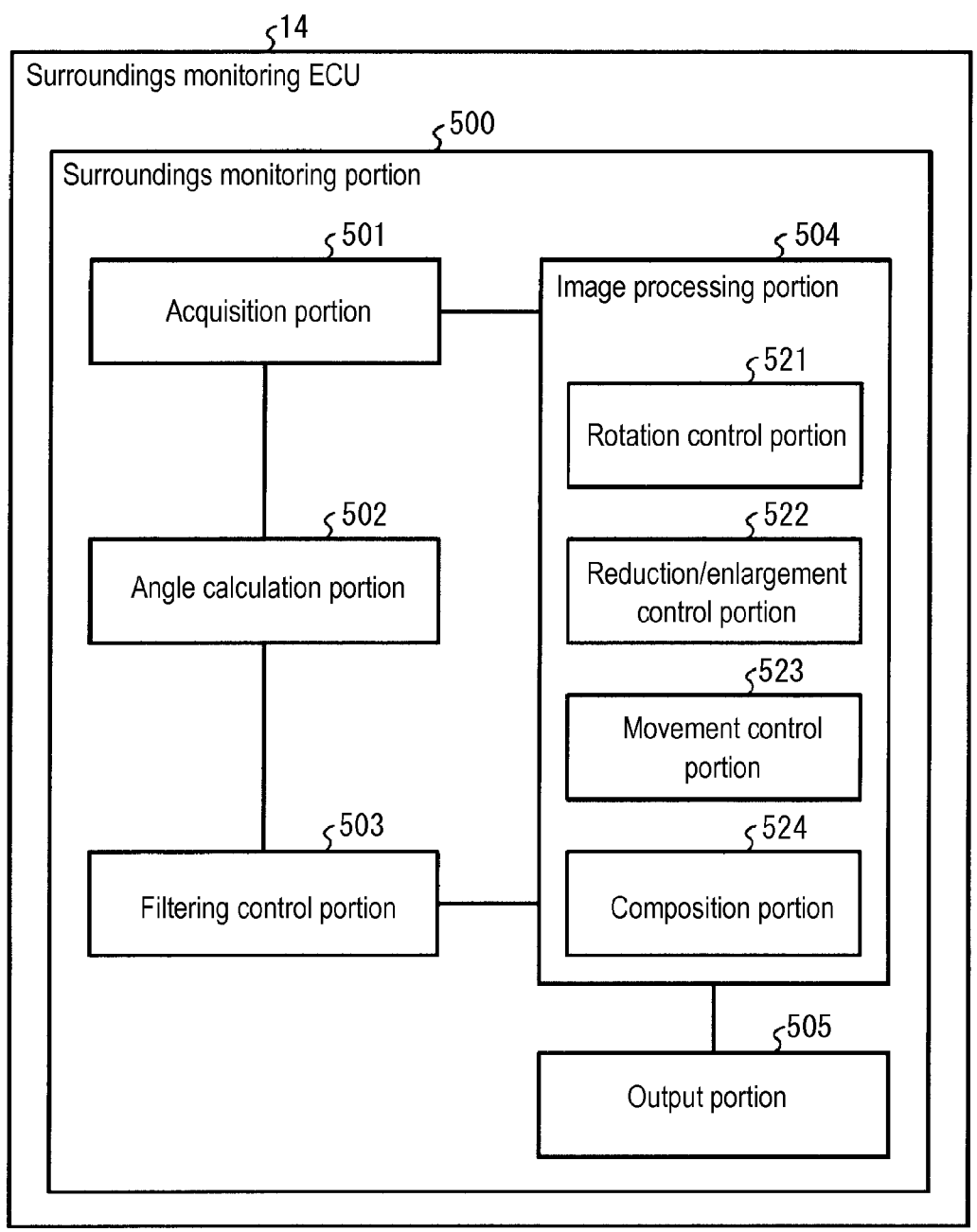
FIG. 5 is a block diagram illustrating a construction of a surroundings monitoring portion realized within a surroundings monitoring ECU according to the embodiment.

FIG. 5 is a block diagram illustrating a construction of a surroundings monitoring portion 500 realized within the surroundings monitoring ECU 14 according to the embodiment. Each construction within the surroundings monitoring portion 500 illustrated in FIG. 5 is realized in a case where the CPU 14*a* configured as the surroundings monitoring ECU 14 in FIG. 4 performs software stored within the ROM 14*b*.

The surroundings monitoring portion 500 realizes an acquisition portion 501 (i.e., serving as a first acquisition portion), an angle calculation portion 502 (i.e., serving as a second acquisition portion), a filtering control portion 503, an image processing portion 504 and an output portion 505 by performing software stored within the ROM 14*b* (computer readable storage medium). At this time, software (program) may be provided via other computer readable storage medium.

Then, the surroundings monitoring portion 500 according to the embodiment assists the driving of the driver by displaying the image data by which a state around the vehicle 1 is recognizable on the basis of the captured image data input from the imaging portions 16 in a case where the vehicle 1 moves to be parked, and the acceleration data as an example of a vehicle state data acquired by the acceleration sensor 26 (acceleration detection portion) functioning as an example of a vehicle state detection portion.

The acquisition portion 501 acquires various pieces of information from various sensors, for example, provided at the vehicle 1. The acquisition portion 501 according to the embodiment acquires the captured image data output from the imaging portions 16*a* to 16*d* provided at the vehicle 1 to capture the images in the surroundings of the vehicle 1 and the acceleration data output from the acceleration sensors 26*a*, 26*b* provided at the vehicle 1. Further, the acquisition portion 501 acquires information indicating whether or not a mode specified by a switch provided at the operation input portion 10 is an off-road mode. The acquisition portion 501 outputs the acquired information to the angle calculation portion 502 and the image processing portion 504.

The acquisition portion 501 also correlates the captured image data with the acceleration data where time when the image is captured in the captured image data and time when the acceleration is detected in the acceleration data substantially match each other.

The angle calculation portion 502 calculates an inclination angle (a pitch angle and a roll angle) of the vehicle 1 based on the acceleration data acquired by the acceleration sensors 26*a*, 26*b* that is an example of the vehicle state detection portion mounted to the vehicle 1. In the embodiment, an example of calculating the inclination angle of the vehicle 1 in response to the acceleration data outputted by the acceleration sensors 26*a*, 26*b* will be explained. Alternatively, any method can be applied as long as obtaining the inclination angle of the vehicle 1.

The pitch angle (i.e., serving as a second inclination angle) is an angle indicating an inclination of the surroundings of a lateral axis (an axis 412 in FIG. 4) of the vehicle 1. In a case where the vehicle 1 is present on the lateral plane (ground), the roll angle (i.e., serving as a first inclination angle) is zero degrees.

The roll angle is an angle indicating an inclination of the vehicle 1 around a longitudinal axis (axis 411 in FIG. 4) of the vehicle 1. In a case where the vehicle 1 is present on the lateral plane (ground), the roll angle is zero degrees. In order to calculate the pitch angle and the roll angle, the angle calculation portion 502 first calculates an acceleration a1 in the front-rear direction and an acceleration a2 in the right-left direction of the vehicle 1.

The angle calculation portion 502 calculates the acceleration a1 in the front-rear direction using the following equation (1). The acceleration in the detection direction 401 is specified to be GL1 and the acceleration in the detection direction 402 is specified to be GL2. The pitch angle is calculated from the acceleration a1 in the front-rear directions and from the acceleration of gravity. The roll angle is calculated from the acceleration a2 in the right-left directions and the acceleration of gravity.

$$a1 = GL1 \times \cos 45° - GL2 \times \cos 45° \tag{1}$$

Next, the angle calculation portion 502 calculates the acceleration a2 in the right-left direction using the following equation (2).

$$a2 = -(GL1 \times \sin 45° + GL2 \times)\sin 45° \tag{2}$$

Further, the angle calculation portion 502 calculates a pitch angle PA using the following equation (3).

$$PA = \sin^{-1}(a1/1G) \tag{3}$$

Further, the angle calculation portion 502 calculates a roll angle RA using the following equation (4).

$$RA = \sin^{-1}(a2/1G) \tag{4}$$

The angle calculation portion 502 correlates the roll angle and the pitch angle calculated from the acceleration data with the captured image data that is correlated to the aforementioned acceleration data. Accordingly, the roll angle and the pitch angle of the vehicle 1 when the captured image data is captured are recognizable.

The filtering control portion 503 performs filtering by low-pass filter relative to the roll angle RA and the pitch angle PA calculated by the angle calculation portion 502.

In the embodiment, steep changes of the roll angle RA and the pitch angle PA, in other words, a steep switching of the image data displayed at the display device 8 is restrained by performing the low-pass filter. Accordingly, the driver may comfortably watch the image data displayed at the display device 8. In the embodiment, an example where digital filter is used by the filtering control portion 503 provided within the surroundings monitoring portion 500 is explained. Nevertheless, for example, analog filter, for example, may be performed relative to a signal output from the acceleration sensor 26.

The image processing portion 504 includes a rotation control portion 521, a reduction/enlargement control portion 522, a movement control portion 523 and a composition portion 524 to generate the image data displayed at the display device 8.

The rotation control portion 521 performs a rotation correction on the captured image data capturing the surroundings of a front side of the vehicle 1. A subject of the rotation correction is not limited to the captured image data captured by the imaging portion 16a and may be the captured image data captured by the imaging portion 16c capturing the surroundings of a rear side of the vehicle 1, for example.

Figure 6:
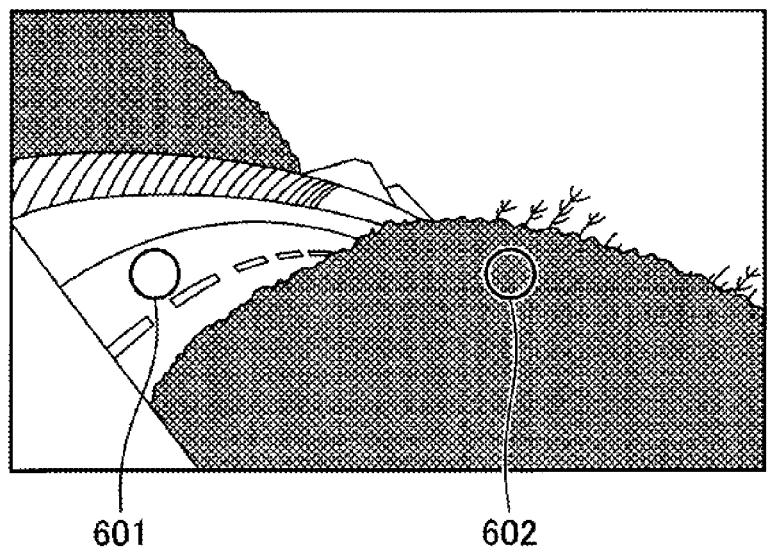
FIG. 6 is an example of captured image data captured by an imaging portion according to the embodiment.

FIG. 6 is an example of the captured image data captured by the imaging portion 16a. The captured image data illustrated in FIG. 6 is captured from the vehicle 1 that is inclined. The driver tends to recognize the image displayed at the display device 8 in an objective way and thus tends to recognize areas in the captured image data displayed at the display device 8, in a case where the areas include the same heights in a vertical axis direction, include the same heights in reality or heights with a smaller height difference than the actual height difference. In the example illustrated in FIG. 6, a region 601 and a region 602 are possibly recognized as the same heights.

Thus, the rotation control portion 521 according to the embodiment performs the rotation correction on the captured image data depending on the roll angle obtained by the acceleration sensors 26. In other words, the rotation control portion 521 performs the rotation correction (control) on the captured image data based on the inclination of the vehicle in the right-left direction relative to the lateral direction serving as the direction included in the lateral plane orthogonal to the direction of gravity calculated from the vehicle state data. For example, the rotation control portion 521 performs the rotation correction (control) so that a lateral line included in a subject captured in the captured image data is substantially parallel to a lateral-direction side at a display region of an output destination.

The rotation control portion 521 according to the embodiment performs the rotation correction with an origin at a position coordinate within the display region of the captured image data corresponding to a center of a lens used by the imaging portion 16 for image capturing depending on the roll angle correlated to the aforementioned captured image data.

Figure 7:
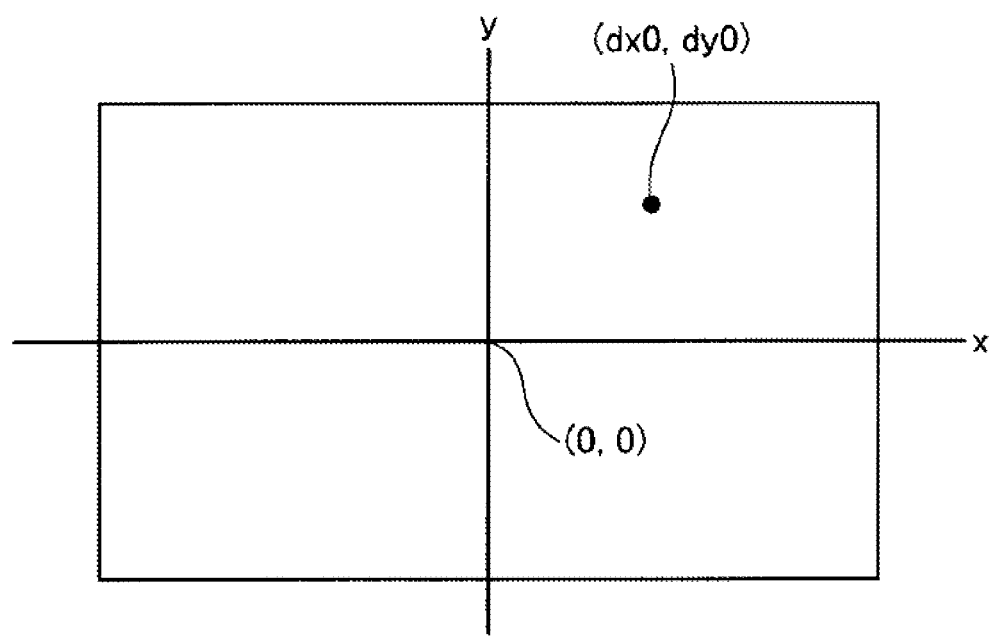
FIG. 7 is a diagram illustrating an example of a two-dimensional orthogonal coordinate system that indicates a display region of the captured image data in a case where a position coordinate corresponding to a center of a lens serves as an origin.

FIG. 7 is a diagram illustrating an example of a two-dimensional orthogonal coordinate system that indicates the display region of the captured image data in a case where the position coordinate corresponding to the center of the lens serves as the origin. For each position coordinate included in the coordinate system illustrated in FIG. 7, the rotation control portion 521 converts the position coordinate by an equation (5) indicated below so as to achieve the rotation correction of the captured image data. Here, dx0, dy0 is a coordinate value with the origin at the center of the lens. In addition, θ is the roll angle that is calculated.

[Mathematical 1]

$$\begin{pmatrix} dx1 \\ dy1 \end{pmatrix} = \begin{pmatrix} \cos\theta & \sin\theta \\ -\sin\theta & \cos\theta \end{pmatrix} \begin{pmatrix} dx0 \\ dy0 \end{pmatrix} \tag{5}$$

Figure 8:
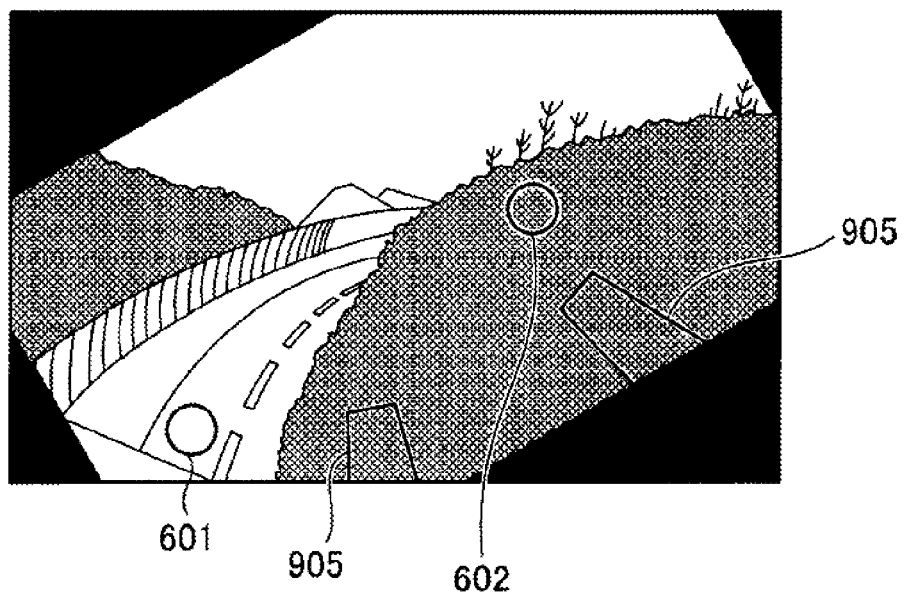
FIG. 8 is a diagram illustrating an example of the captured image data after a rotation correction is performed by a rotation control portion according to the embodiment.

FIG. 8 is a diagram illustrating an example of the captured image data obtained after the rotation correction is performed by the rotation control portion 521. In the example illustrated in FIG. 8, the rotation correction is performed so that the lateral line included in the subject (environment outside the vehicle 1) captured in the captured image data is substantially in parallel with the lateral-direction side of the display region of the display device 8. In other words, the rotation correction is performed so that a lower direction of the captured image data corresponds to the direction of gravity of the subject (environment outside the vehicle 1) captured in the aforementioned captured image data. At this time, the lower direction and the direction of gravity do not necessarily completely coincide with each other and may coincide with each other so that a height relation within the captured image data is recognizable.

For example, as for the region 601 and the region 602 which seem to include the same heights in FIG. 6, it is recognizable in FIG. 8 that the region 602 is present at a higher position than the region 601. Therefore, the driver may recognize an objective height in the surrounding environments of the vehicle 1. Accordingly, an appropriate driving is achievable, which may improve safety.

The reduction/enlargement control portion 522 functioning as the control portion performs an enlargement processing or a reduction processing relative to the captured image data after the rotation correction is performed by the rotation control portion 521. The reduction/enlargement control portion 522 converts the position coordinate by an equation (6) indicated below to achieve an enlargement correction or a reduction correction of the captured image data. Here, dx1, dy1 is a coordinate value with the origin at the center of the lens after the rotation correction is performed. Here, magX and magY are lateral and vertical enlargement/reduction rates. The enlargement/reduction rate is decided on a basis of a relationship between a display size of the captured image data and number of pixels of the display region of the display device 8.

[Mathematical 2]

$$\begin{pmatrix} dx2 \\ dy2 \end{pmatrix} = (magX \quad magY) \begin{pmatrix} dx1 \\ dy1 \end{pmatrix} \quad (6)$$

The movement control portion 523 functioning as the control portion performs a control on the captured image data after the enlargement or reduction processing is performed by the reduction/enlargement control portion 522 so that the position coordinate corresponding to the center of the lens moves from the center of the display region of the display device 8. In the embodiment, the movement control portion 523 performs a control to move the position coordinate corresponding to the center of the lens from the center of the display region of the display device 8 to an upper direction within the display region.

That is, in a situation where the vehicle 1 is inclined, the driver tends to desire to confirm the ground conditions. Thus, the movement control portion 523 performs the processing to move the position coordinate corresponding to the center of the lens from the center of the display region of the display device 8 to the upper direction within the display region. Accordingly, conditions upper than the vehicle 1 such as the sky captured in the captured image data, for example, are not displayed and conditions lower than the vehicle 1 are displayed. Thus, the user may recognize the ground conditions around the vehicle 1 by referring to the captured image data displayed at the display device 8. Accordingly, an appropriate steering assist is achievable.

The movement control portion 523 converts the position coordinate by an equation (7) indicated below to achieve the movement of the position coordinate of the captured image data. Here, dx2, dy2 is a coordinate value with the origin at the center of the lens after the enlargement/reduction correction is performed. Here, a destination of the position coordinate of the center of the lens before the movement is (cx, cy).

[Mathematical 3]

$$\begin{pmatrix} dx3 \\ dy3 \end{pmatrix} = \begin{pmatrix} dx2 + cx \\ dy2 + cy \end{pmatrix} \quad (7)$$

The composition portion 524 performs a cutout relative to the captured image data after the movement control is performed by the movement control portion 523 so as to conform to the display region of the display device 8 and thereafter combines display information for assisting the steering of the driver.

Figure 9:
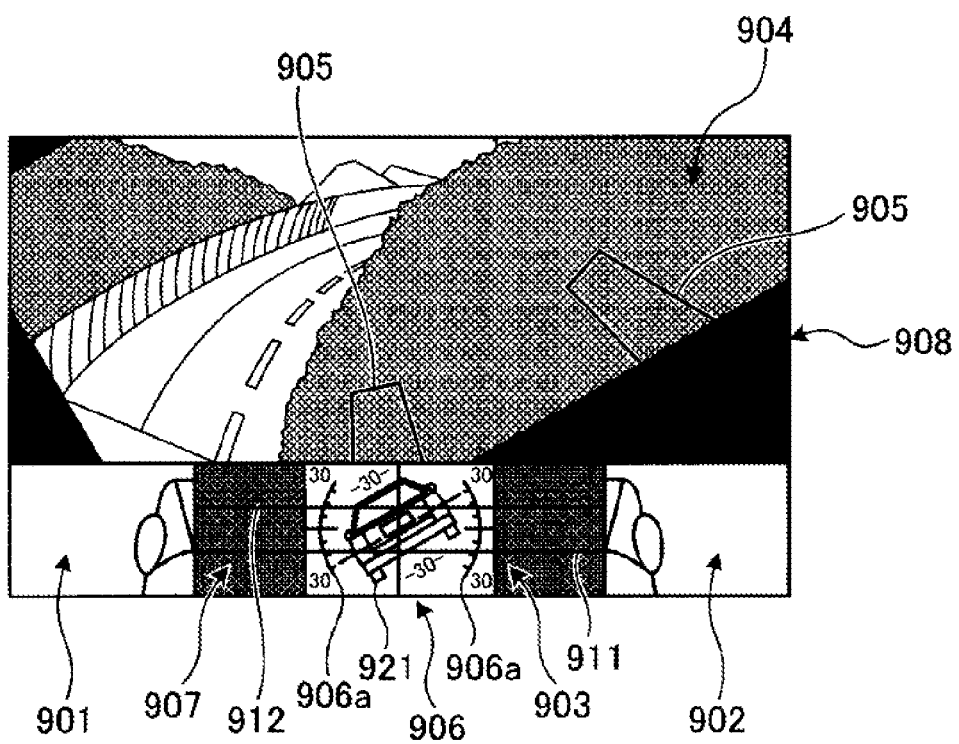
FIG. 9 is a diagram illustrating an example of image data after a composition portion performs composition according to the embodiment.

FIG. 9 is a diagram illustrating an example of the image data after the composition is performed by the composition portion 524. In the example illustrated in FIG. 9, conditions around the left front wheel of the vehicle 1 captured by the imaging portion 16b is displayed at a display region (a captured image data 901). In addition, conditions around the right front wheel of the vehicle 1 captured by the imaging portion 16d is displayed at a display region (a captured image data 902). Further, information by which the pitch angle and the roll angle of the vehicle 1 are recognizable is displayed at a display region 903. That is, an inclination of an icon 921 representing the vehicle 1 indicates the roll angle while a distance between a center line 912 passing through the icon 921 and a line 911 indicates the pitch angle. Accordingly, in the embodiment, information by which the roll angle and the pitch angle are recognizable is indicated, however, display method is not limited to the above and other display method is acceptable.

Meanwhile, the captured image data after the cutout by the composition portion 524 is displayed at a display region (a captured image data 904). In other words, the rotation correction is performed so that a lower direction of the captured image data corresponds to the direction of gravity. Accordingly, the driver may easily and objectively recognize the conditions of the surroundings of the vehicle 1.

However, in a case where the driver tries to recognize the conditions of the surroundings of the vehicle 1 with the captured image data displayed at the display device 8, it may be difficult to recognize the inclination of the vehicle 1 from the captured image data depending on the conditions of the surroundings of the vehicle 1. In addition, because a tiltmeter 906 indicating the pitch angle and the roll angle of the vehicle 1 is shown at the display device 8, the driver is desired to gaze the tiltmeter 906, or to watch the tiltmeter 906 carefully in order to recognize the pitch angle and the roll angle. In a case where the driver gazes the captured image data, it may be difficult for the driver to recognize what is displayed at the tiltmeter 906.

Here, according to the embodiment, respective background colors of the display regions 903, 908 change in response to the inclination angle (the pitch angle or the roll angle) of the vehicle 1. Accordingly, the driver may recognize the current inclination angle of the vehicle 1 without gazing the tiltmeter 906. In a case where the driver desires to know the inclination angle further accurately when recognizing the current inclination angle of the vehicle, the tiltmeter 906 is to be watched. Thus, the driver may easily recognize the conditions of the surroundings of the vehicle 1.

Then, the output portion 505 outputs the image data that is composited by the composition portion 524 to the display device 8. Accordingly, together with the aforementioned captured image data after the correction processing is performed, information by which the roll angle and the pitch angle are recognizable is displayed at the display device 8.

In the example of FIG. 8 or 9, an estimated course line 905 of each of the front wheels 3F is included. The surroundings monitoring ECU 14 (CPU 14a) calculates a planned course based on detection results of the steering angle sensor 19 and the tire angle sensor 13b, for example, and to include (overlap) the estimated course line 905 conforming to the planned course in the output image. The estimated course line 905 is an example of a display element indicating the course that is planned. The surroundings monitoring ECU 14 corrects the display position, size, posture (inclination) and the like of the estimated course line 905 depending on the aforementioned rotation, enlargement/reduction and movement corrections. In addition, in a case where the position of the estimated course line 905 is greatly deviated from a center of the screen, the surroundings monitoring ECU 14 corrects the display region and the estimated course line 905 in a direction where the deviation is reduced.

In the example of FIG. 9, the inclination of the icon 921 relative to a lateral-direction side of the display region 903 or the display region (the captured image data 904) (an upper side or a lower side in FIG. 9) corresponds to the roll angle of the vehicle 1. Thus, the surroundings monitoring ECU 14 may constitute the tiltmeter 906 (roll angle display portion) using the icon 921 by including an angle scale 906a (tilt scale) surrounding the icon 921 in the output image in a manner that an angle of the angle scale 906a remains unchanged relative to the display region 903. For example, only by the display of the display region (the captured image data 904), it may be difficult to understand the lateral direction, the vertical direction, and the posture (the roll angle or the pitch angle) of the vehicle 1. In this point, as in the example of FIG. 9, the icon 921 that performs rotation (rolling) and pitching is displayed and the tiltmeter 906 is displayed on the screen depending on the roll angle and the pitch angle so that the lateral direction, the vertical direction and the posture (the roll angle) of the vehicle 1 may be easily understood, regardless of the state of the image of the display region (the captured image data 904). Accordingly, the display region (the captured image data 904) and the display region (the captured image data 903) are displayed together (displayed within the same screen or displayed in parallel with each other) so that the state around the vehicle and the state of the posture of the vehicle may be further easily understood.

In addition, the embodiment may not perform the aforementioned rotation, enlargement/reduction and movement corrections on a constant basis and may be specified to perform the aforementioned corrections in a case where the vehicle 1 is brought to the off-road mode. For example, the image processing portion 504 performs the aforementioned rotation, enlargement/reduction and movement corrections at the time of the off-road mode by referring to information acquired by the acquisition portion 501 indicating whether or not the vehicle 1 is in the off-road mode.

Here, the off-road mode corresponds to the mode for bringing out a four-wheel driving performance of the vehicle 1 during the off-road driving and the mode for specifying a total transfer gear to be low. That is, in the embodiment, the captured image data displayed at the display device 8 is switched in association with the operation when the off-road driving is performed. At this time, in the embodiment, the switching of the image displayed at the display device 8 is not limited to be performed in a case where the vehicle 1 is switched to the off-road mode. For example, in a case where the vehicle 1 is switched to the four-wheel driving in a two/four wheel drive switching, it may be controlled that the image after the rotation correction is performed is displayed.

According to the embodiment, the tiltmeter 906 is not limited to be displayed on a constant basis in the off road mode, and the tiltmeter 906 may be displayed in a case where the inclination angle of the vehicle 1 comes to be equal to or greater than a predetermined angle. According to the embodiment, in a case where the inclination angle of the vehicle 1 is less than, for example, 10 degrees (i.e., serving as a first angle), the output portion 505 outputs an output image data including the captured image data. In a case where the inclination angle of the vehicle 1 comes to be equal to or greater than, for example, 10 degrees, the output portion 505 outputs an output image data in which the captured image data and the tiltmeter 906 are combined. Moreover, in a case where the inclination angle of the vehicle 1 comes to be equal to or greater than, for example, 30 degrees (i.e., serving as a second angle), the composition portion 524 combines the captured image data and the tiltmeter 906 and the output portion 505 changes the display method of the output image data.

Figure 10:
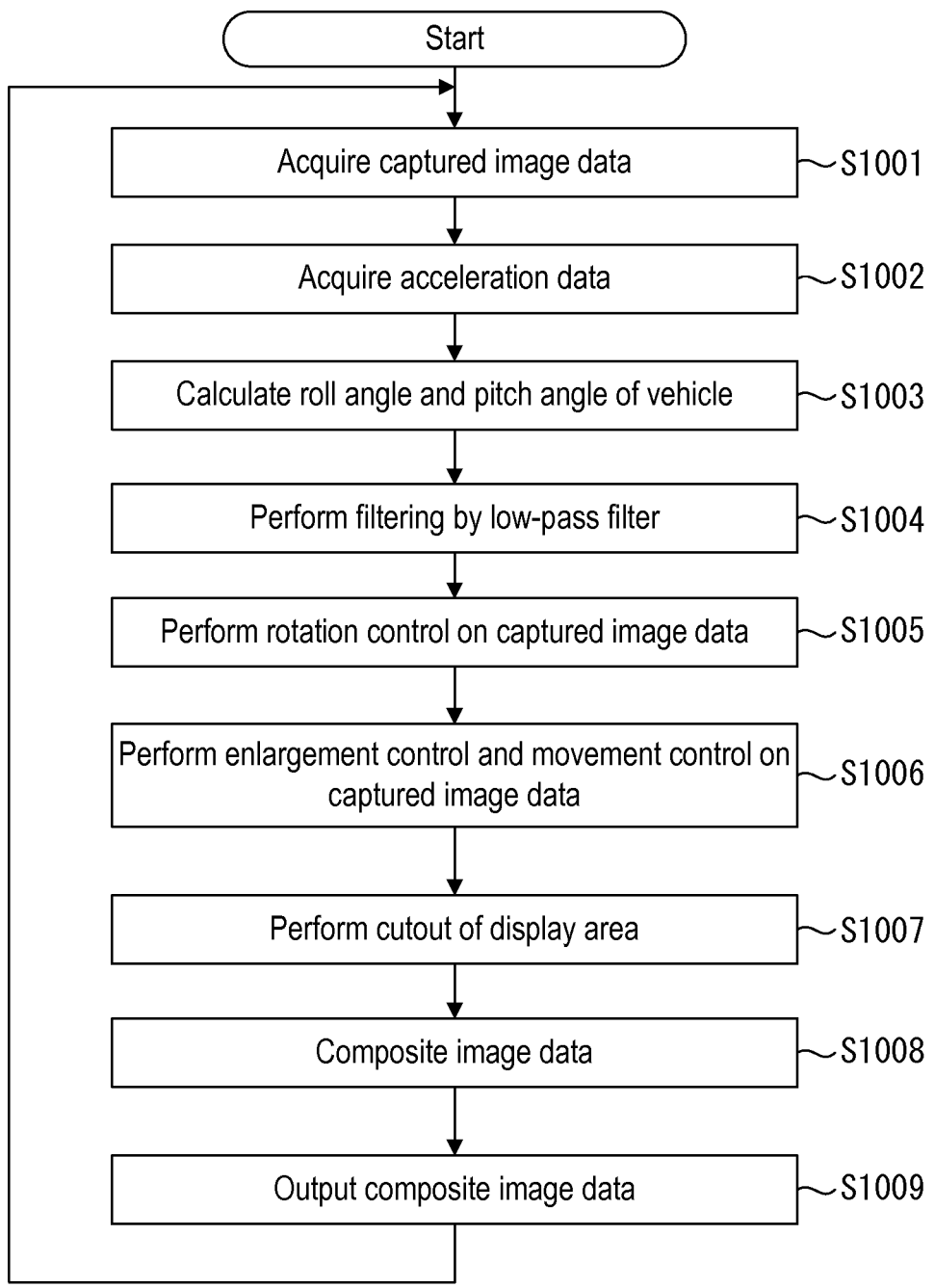
FIG. 10 is a flowchart illustrating procedures of a display processing on a display device in a surroundings monitoring portion according to the embodiment.

Next, a display processing at the display device 8 in the surroundings monitoring portion 500 according to the embodiment is explained. FIG. 10 is a flowchart illustrating procedures of the aforementioned processing in the surroundings monitoring portion 500 according to the embodiment.

First, the acquisition portion 501 acquires the captured image data from the imaging portions 16 (step S1001). Next, the acquisition portion 501 acquires the acceleration data from the acceleration sensors 26 (step S1002).

Then, the angle calculation portion 502 calculates the roll angle and the pitch angle of the vehicle 1 from the acceleration data (step S1003).

Next, the filtering control portion 503 performs filtering by low-pass filter relative to the calculated roll angle and the calculated pitch angle (step S1004).

Then, the rotation control portion 521 performs the rotation control relative to the captured image data depending on the roll angle (step S1005).

Next, the reduction/enlargement control portion 522 and the movement control portion 523 perform the enlargement control and the movement control on the captured image data after the rotation control is performed (step S1006).

Then, the composition portion 524 performs the cutout conforming to the display region displayed at the display device 8 relative to the captured image data after the enlargement control and the movement control are performed (step S1007).

Next, the composition portion 524 combines the captured image data indicating the state around the front wheels and the display information by which the pitch angle and the roll angle are recognizable relative to the captured image data that is cut out (step S1008).

Then, the output portion 505 outputs the image data after the composition by the composition portion 524 to the display device 8 (step S1009).

Figure 11:
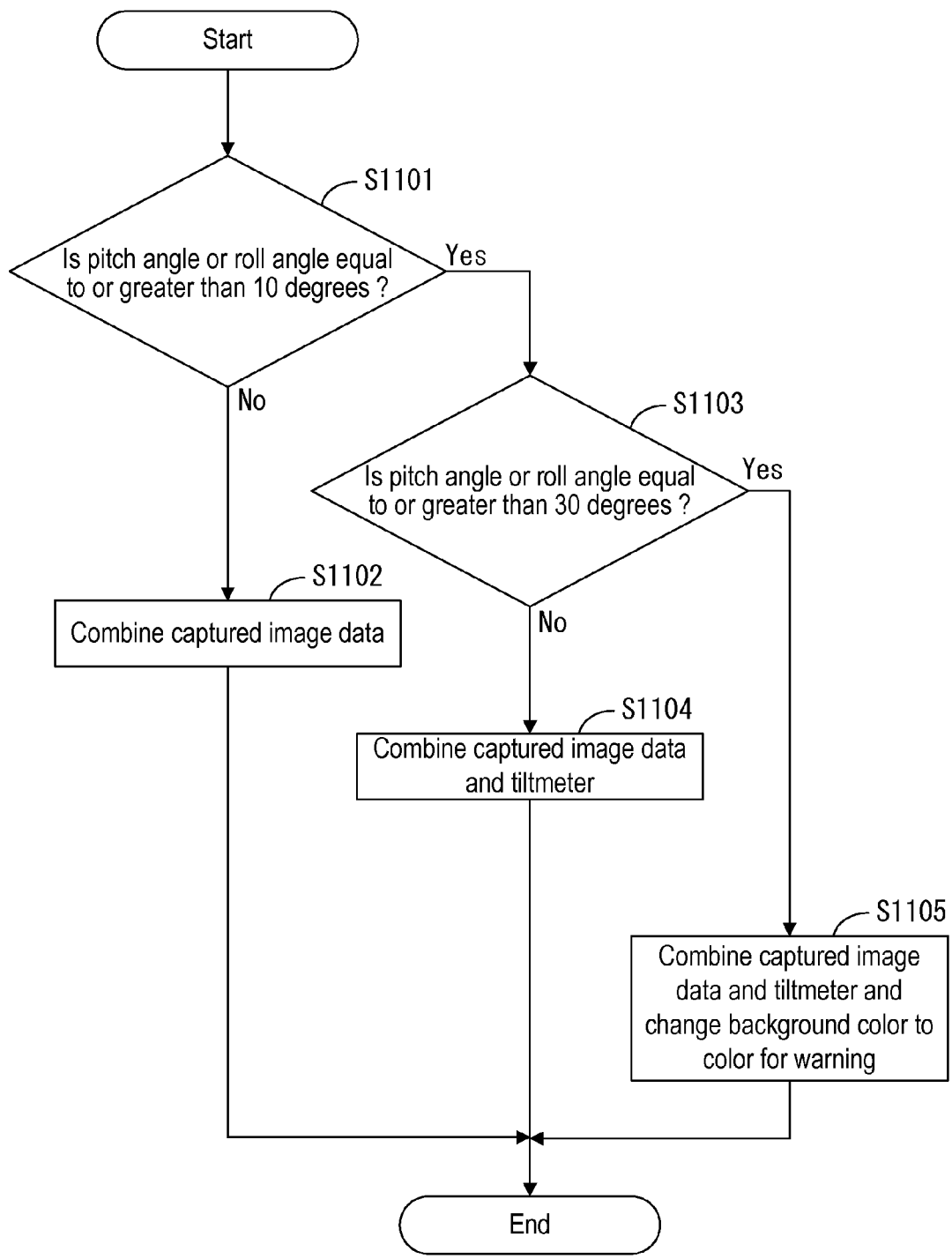
FIG. 11 is a flowchart illustrating procedures of a composition processing of an image data that is displayed on a display device in a surroundings monitoring portion according to the embodiment.

Next, the composition processing of the image data by the surroundings monitoring portion 500 of the embodiment for being displayed at the display device 8 will be explained. The composition processing is at step S1008. FIG. 11 is a flowchart illustrating the aforementioned processing procedures proceeded by the surroundings monitoring portion 500 of the embodiment.

First, the composition portion 524 determines whether the inclination angle (the pitch angle or the roll angle) input from the filtering control portion 503 is equal to or greater than 10 degrees (step S1101). In a case where the composition portion 524 determines that the inclination angle is less than 10 degrees (No in step S1101), the composition portion 524 combines the captured image data captured by the imaging portions 16a, 16b, 16c and generates an output image data (step S1102).

Figure 12:
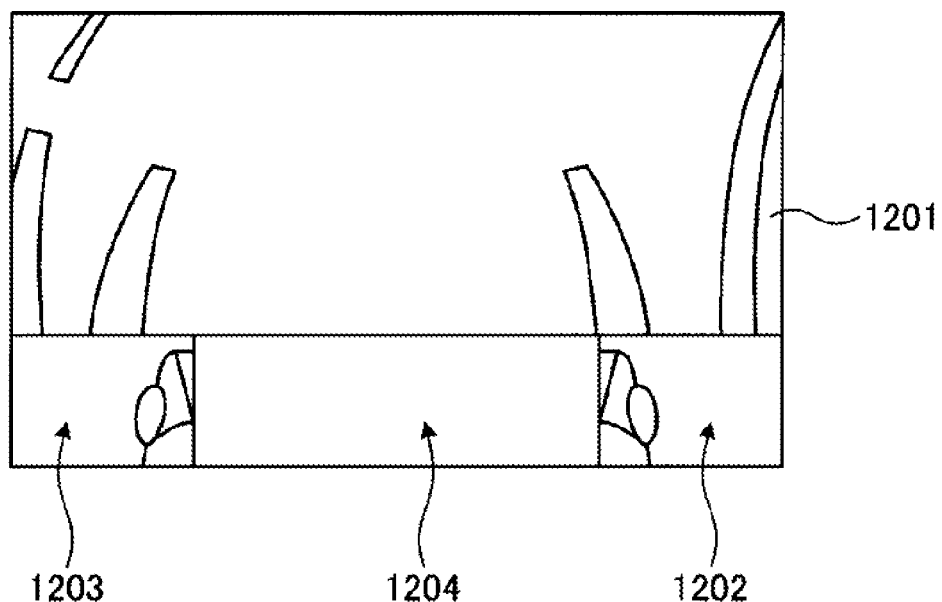
FIG. 12 is a view illustrating an example of an output image data after the composition portion performs composition according to the embodiment.

FIG. 12 is a view illustrating an example of the output image data generated by the composition portion 524 in step S1102. As shown in FIG. 12, a captured image data 1201 captured by the imaging portion 16a, a captured image data 1203 captured by the imaging portion 16b, and a captured image data 1202 captured by the imaging portion 16d are combined. For example, the tiltmeter 906 is not displayed at a display region 1204. In FIG. 12, because the driver only has to refer to the captured image data, the burden for the driver may be reduced.

On the other hand, in a case where the composition portion 524 determines that the inclination angle (the roll angle or the pitch angle) input from the filtering control portion 503 is equal to or greater than 10 degrees (Yes in step S1101), the composition portion 524 determines whether the inclination angle (the roll angle or the pitch angle) is equal to or greater than 30 degrees (step S1103). In a case where the composition portion 524 determines that the inclination angle is less than 30 degrees (No in step 1103), the composition portion 524 generates an output image data by combining the captured image data and the tiltmeter 906 (step S1104).

Figure 13:
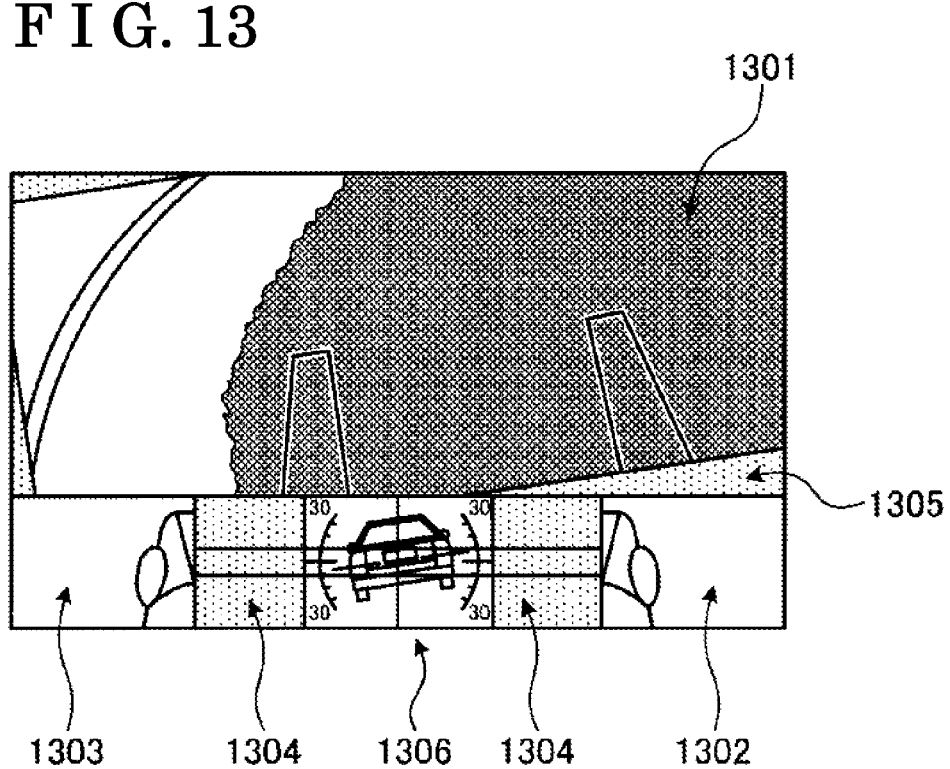
FIG. 13 is a view illustrating another example of the output image data after the composition portion performs composition according to the embodiment.

FIG. 13 is a view illustrating the output image data generated by the composition portion 524 in step S1104. As shown in FIG. 13, a captured image data 1301 captured by the imaging portion 16*a*, a captured image data 1303 captured by the imaging portion 16*b*, a captured image data 1302 captured by the imaging portion 16*d* and a tiltmeter 1306 are combined. Display regions 1304, 1305 of the output image data shown in FIG. 13 are displayed with a background color specified for the inclination angles, 10 to 30 degrees, of the vehicle 1. Any background color, for example, blue, is applicable.

On the other hand, in a case where the composition portion 524 determines that the inclination angle (the roll angle or the pitch angle) input from the filtering control portion 503 comes to be greater than 30 degrees (Yes in step S1103), the composition portion combines the captured image data and the tiltmeter 1306 generates an output image data in which the color of the background is changed to a color for warning (step S1105).

FIG. 9 illustrates the output image data generated in a case where the inclination angle (the roll angle or the pitch angle) comes to be equal to or greater than 30 degrees. As mentioned above, the composition portion 524 combines the captured image data 901, 902, 904 and the tiltmeter 906 and the output portion 505 changes the background colors of display regions 907, 908 to the color for warning. The color for warning is, for example, red or yellow.

According to the embodiment, a brightness value, a color tone and a coloration of the display region displayed at the display device 8 may change in accordance with the inclination angle of the vehicle 1.

As such, because the background color is changed to the color for warning, the driver may recognize the inclination state of the vehicle 1 without gazing the tiltmeter 906, or without watching the tiltmeter 906 carefully. That is, the driver may recognize the inclination state of the vehicle 1 from the background color of the display device 8 while recognizing the conditions of the surroundings by gazing, or carefully watching the captured image data displayed at the display device 8. That is, it is difficult for the driver to recognize the current state of the vehicle 1 by referring to only the captured image data displayed at the display device 8. However, according to the embodiment, because the state of the inclination angle of the vehicle 1 is displayed with the background color when the display device 8 displays the captured image data, the driver may recognize various statuses of the vehicle 1 by only referring to the display device 8. Accordingly, the burden for the driver when steering may be reduced.

As mentioned above, the composition portion 524 of the embodiment composes the output image data that changes the background color in accordance with the conditions of the inclination of the vehicle 1. Thus, the output portion 505 outputs the output image data that changes the background color in accordance with the inclination angle of the vehicle 1.

A first modified example of the embodiment will hereunder be explained. According to the embodiment, the background color changes, or varies as the display method. However, the display method that changes in accordance with the inclination angle is not limited to the background color. According to the first modified example of the embodiment, the warning sign is displayed as the display method in a case where the inclination angle of the vehicle 1 comes to be equal to or greater than 30 degrees.

Figure 14:
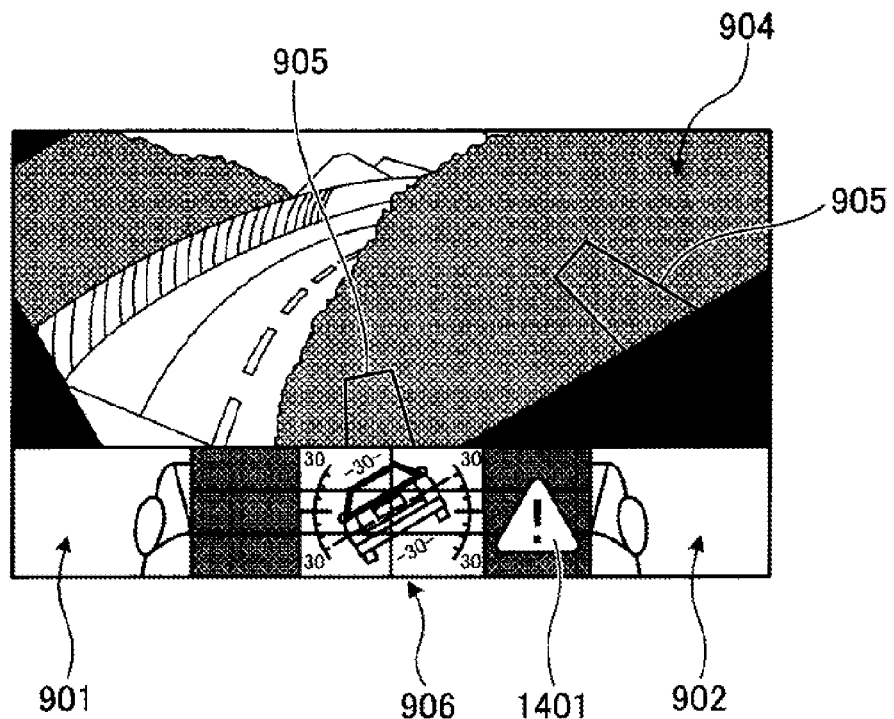
FIG. 14 is a view illustrating an example of an output image data after the composition portion performs composition according to a first modified example of the embodiment.

FIG. 14 is a view illustrating an example of an image data generated by the composition portion 524 in a case where the inclination angle of the vehicle comes to be equal to or greater than 30 degrees. The image data shown in FIG. 14 illustrates a warning sign 1401 (i.e., serving as an icon) in addition to the combination of the captured image data 901, 902, 904 and the tiltmeter 906. In a case where the inclination angle of the vehicle 1 comes to be equal to or greater than 30 degrees, the warning sign 1401 is applied to the image data outputted by the composition portion 524.

According to the first modified example of the embodiment, because the warning sign 1401 is displayed at the display device 8 in addition to the captured image data 901, 902, 904 and the tiltmeter 906 in a case where the driver refers to the display device 8, the driver may recognize the conditions of the vehicle 1.

A second modified example of the embodiment will hereunder be explained. According to the embodiment, the background of the display region excluding the captured image data and the tiltmeter 906 changes, or varies in a case where the inclination angle of the vehicle 1 comes to be equal to or greater than 30 degrees. According to the first modified example of the embodiment, the warning sign is displayed at the display region in a case where the inclination angle of the vehicle 1 comes to be equal to or greater than 30 degrees. Alternatively, the display method of the captured image data and of the tiltmeter 906 can be changed. According to the second modified example of the embodiment, the display method of the captured image data captured by the imaging portions 16*b*, 16*d* is changed.

Figure 15:
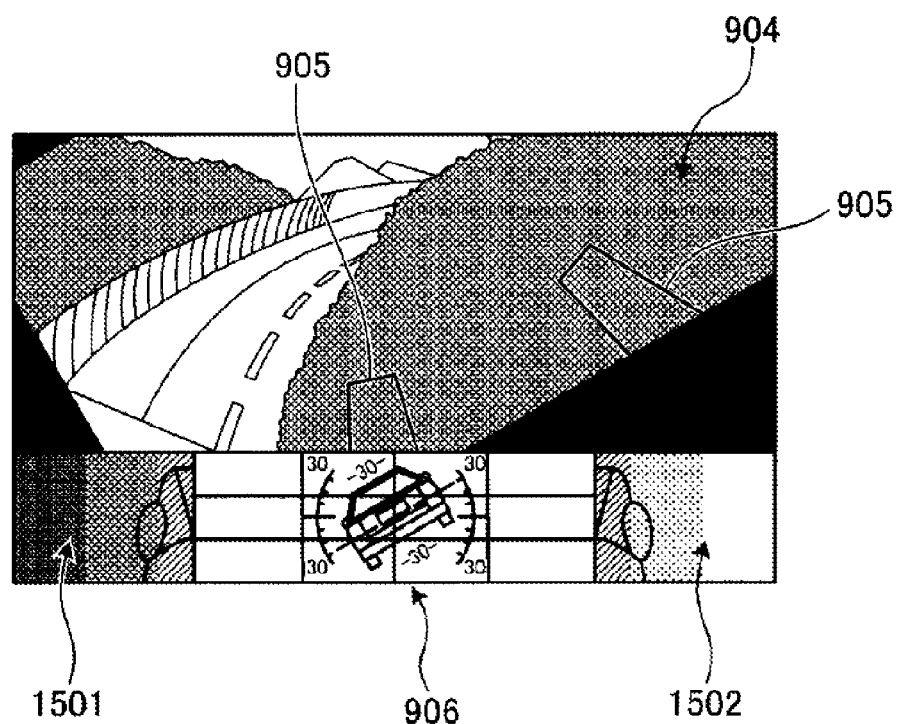
FIG. 15 is a view illustrating an example of an output image data after the composition portion performs composition according to a second modified example of the embodiment.

FIG. 15 is a view illustrating an example of an image data being generated in a case where the tilt angle of the vehicle 1 comes to be equal to or greater than 30 degrees. Captured image data 904, 1501, 1502 and the tiltmeter 906 are combined to generate the image data shown in FIG. 15. Comparing to a case where the inclination angle is less than 30 degrees, the display method of the captured image data 1501, 1502 is changed. As shown in FIG. 15, the brightness value of the captured image data 1501, 1502 changes in accordance with the height relative to the lateral plane. That is, the darker the portions of the captured image data 1501, 1502 are, the lower the height relative to the lateral plane is. The brighter the portions of the captured image data 1501, 1502 are, the higher the height relative to the lateral plane is. As shown in FIG. 15, the left of the vehicle is positioned at a lower position and the right of the vehicle is positioned at a higher position. Because the display shown in FIG. 15 is displayed in a case where the inclination angle of the vehicle 1 comes to be equal to or greater than 30 degrees, the driver may recognize the inclination state of the vehicle 1.

According to the second modified example of the embodiment, the output portion 505 outputs the image data that changes the display method (for example, the color tone or the brightness value) of the captured image data captured by the imaging portions 16*b*, 16*d* in a case where the inclination angle comes to be equal to or greater than 30 degrees. Alternatively, the captured image data that changes the display method is not limited to the captured image data captured by the imaging portions 16b, 16d. Alternatively, the display method (for example, the color tone or the brightness value) of the captured image data captured by the imaging portion 16a can be changed.

A third modified example of the embodiment will hereunder be explained. According to the aforementioned embodiment and the first and second modified examples of the embodiment, the display method is changed in a case where the inclination angle of the vehicle 1 comes to be equal to or greater than 30 degrees. However, according to the aforementioned embodiment and the first and second modified examples of the embodiment, the inclination angle is not specified as the pitch angle or the roll angle. Here, according to the third modified example of the embodiment, the composition portion 524 changes the display method of the display region of the output image data in accordance with the roll angle, and the composition portion 524 changes the display method of the display region of the output image data in accordance with the pitch angle. For example, in a case where the roll angle comes to be equal to or greater than 30 degrees, the color of a predetermined display region of the output image data can be changed red, and in a case where the pitch angle comes to be equal to or greater than 30 degrees, the color of the predetermined display region of the output image data can be changed yellow (i.e., serving as a first display method). In a case where the roll angle comes to be equal to or greater than 30 degrees and the pitch angle is equal to or greater than 30 degrees, a color of the predetermined display region can be changed orange (i.e., serving as a second display method). Thus, the driver may recognize the inclination state of the vehicle 1 without gazing the tiltmeter 906, or without watching the tiltmeter 906 carefully.

According to the aforementioned embodiment and the first, second and third modified examples of the embodiment, in a case where the display device 8 displays the captured image data and the tiltmeter 906, the display method changes in accordance with the inclination angle of the vehicle 1. Accordingly, the driver may recognize the inclination state of the vehicle 1 by watching the captured image data without referring to the tiltmeter 906. Thus, the driver may easily recognize the conditions of the surroundings of the vehicle 1. That is, because the driver may easily recognize the conditions of the surroundings of the vehicle 1, the burden for the driver when steering may be reduced.

According to the aforementioned embodiment, the vehicle control apparatus includes the first acquisition portion (the acquisition portion 501) acquiring the captured image data (901, 902, 904, 1201, 1202, 1203, 1301, 1302, 1303, 1501, 1502) outputted from the imaging portion (16, 16a, 16b, 16c, 16d) that is provided at the vehicle (1) and that images the surrounding of the vehicle (1), the second acquisition portion (the angle calculation portion 502) acquiring the inclination angle of the vehicle (1) on a basis of the state information of the vehicle (1), the state information outputted from the vehicle state detection portion (26) that is provided at the vehicle (1), and the output portion (505) being configured to output the output image data to the display device (8), the output image data including the captured image data (901, 902, 904, 1201, 1202, 1203, 1301, 1302, 1303, 1501, 1502) and the inclination angle display information indicating the inclination angle of the vehicle (1), the output portion (505) changing the display method within the output image data in accordance with the inclination angle of the vehicle (1) and outputting the output image data.

Accordingly, as an example, because the driver recognizes the conditions of the surroundings and the inclination of the vehicle 1 when referring to the display device 8, the driver may easily recognize the conditions of the surroundings of the vehicle.

According to the aforementioned embodiment, the output portion (505) changes the color in accordance with the inclination angle of the vehicle (1) as the display method within the output image data.

Accordingly, as an example, because the driver may recognize the inclination of the vehicle 1 with color, the burden for the driver when steering can be reduced.

According to the aforementioned embodiment, the output portion (505) outputs the output image data including the captured image data (901, 902, 904, 1201, 1202, 1203, 1301, 1302, 1303, 1501, 1502) that is rotationally controlled on a basis of the inclination angle of the vehicle (1) relative to the lateral direction or the horizontal direction, the lateral direction that is the direction included in the lateral plane orthogonal to the direction of gravity, by using the inclination angle data of the vehicle (1), the inclination angle data acquired by the second acquiring portion (the angle calculation portion 502).

Accordingly, as an example, because the driver may recognize the conditions of the surroundings of the vehicle 1 with the captured image data, the burden for the driver when steering can be reduced.

According to the aforementioned embodiment, the output portion (505) outputs the output image data including the captured image data (901, 902, 904, 1201, 1202, 1203, 1301, 1302, 1303, 1501, 1502) in a case where the inclination angle of the vehicle (1) is less than the predetermined first angle. The output portion (505) outputs the output image data including the captured image data (901, 902, 904, 1201, 1202, 1203, 1301, 1302, 1303, 1501, 1502) and the inclination angle display information in a case where the inclination angle of the vehicle (1) is equal to or greater than the first angle. The output portion (505) outputs the output image data including the captured image data (901, 902, 904, 1201, 1202, 1203, 1301, 1302, 1303, 1501, 1502) and the inclination angle display information and changes the display method within the display region (903, 907, 908, 1204, 1304, 1305) of the output image data in a case where the inclination angle of the vehicle (1) is equal to or greater than the predetermined second angle that is greater than the first angle.

Accordingly, as an example, because the driver may recognize the inclination of the vehicle 1 with the display method displayed at the display device 8 without referring to the inclination angle display information, the driver may easily recognize the conditions of the surroundings of the vehicle 1.

According to the aforementioned embodiment, the inclination angle includes the first inclination angle of the vehicle (1), the first inclination angle serving as the roll angle, and the second inclination angle of the vehicle (1), the second inclination angle serving as the pitch angle. The display method includes the first display method and the second display method. The output portion (505) changes the first display method within the display region (903, 907, 908, 1204, 1304, 1305) of the output image data in accordance with the roll angle. The output portion (505) changes the second display method within the display region (903, 907, 908, 1204, 1304, 1305) of the output image data in accordance with the pitch angle.

Accordingly, because the display method changes in accordance with the inclination angle of the roll angle or of the pitch angle, the driver may recognize the inclination state of the vehicle 1 without gazing the tiltmeter 906, or without watching the tiltmeter 906 carefully.

According to the aforementioned embodiment, the output portion (505) changes at least one of the color of the captured image data (901, 902, 904, 1201, 1202, 1203, 1301, 1302, 1303, 1501, 1502), the color of the display region (903, 907, 908, 1304, 1305) excluding the captured image data (901, 902, 904, 1201, 1202, 1203, 1301, 1302, 1303, 1501, 1502) and the inclination angle display information, and the color within the inclination angle display information as the display method.

Accordingly, the driver may recognize the conditions of the vehicle 1.

According to the aforementioned embodiment, the display device (8) displays the output image data outputted from the output portion (505), the display device (8) displaying the icon (the warning sign 1401) warning the driver with the output image data as the display method.

Accordingly, because the icon for warning is displayed with the output image data, the driver may recognize the conditions of the vehicle 1.

According to the aforementioned embodiment, the display device (8) displays the output image data outputted from the output portion (505), the display device (8) displaying the output image data that changes the color at the region within the captured image data (1501, 1502) in accordance with the difference in height relative to the lateral plane as the display method.

Accordingly, for example, the driver may recognize the inclination state of the vehicle 1 in a case where the display shows in a manner that the darker the portion of the captured image data is, the lower the height relative to the lateral plane is, and the brighter the portion of the captured image data is, the higher the height relative to the lateral plane is.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle control apparatus comprising:
    a first acquisition portion acquiring captured image data outputted from an imaging portion that is provided at a vehicle and that images a surrounding area of the vehicle;
    a second acquisition portion acquiring an inclination angle of the vehicle on a basis of state information of the vehicle, the state information outputted from a vehicle state detection portion that is provided at the vehicle; and
    an output portion being configured to output output image data to a display device, the output image data including the captured image data and inclination angle display information indicating the inclination angle of the vehicle, the output portion changing a display method within the output image data in accordance with the inclination angle of the vehicle and outputting the output image data,
    wherein
        the output portion outputs the output image data including the captured image data in response to the inclination angle of the vehicle being less than a predetermined first angle;
        the output portion outputs the output image data including the captured image data and the inclination angle display information in response to the inclination angle of the vehicle being equal to or greater than the first angle; and
        the output portion outputs the output image data including the captured image data and the inclination angle display information and changes the display method within a display region of the output image data in response to the inclination angle of the vehicle being equal to or greater than a predetermined second angle that is greater than the first angle.

2. The vehicle control apparatus according to claim 1, wherein the output portion changes a color in accordance with the inclination angle of the vehicle as the display method within the output image data.

3. The vehicle control apparatus according to claim 1, wherein the output portion outputs the output image data including the captured image data that is rotationally controlled on a basis of the inclination angle of the vehicle relative to a lateral direction, the lateral direction that is a direction included in a lateral plane orthogonal to a direction of gravity, by using inclination angle data of the vehicle, the inclination angle data acquired by the second acquiring portion.

4. The vehicle control apparatus according to claim 1, wherein
    the inclination angle includes a first inclination angle of the vehicle, the first inclination angle serving as a roll angle, and a second inclination angle of the vehicle, the second inclination angle serving as a pitch angle;
    the display method includes a first display method and a second display method;
    the output portion changes the first display method within a display region of the output image data in accordance with the roll angle; and
    the output portion changes the second display method within the display region of the output image data in accordance with the pitch angle.

5. The vehicle control apparatus according to claim 1, wherein the output portion changes at least one of a color of the captured image data, a color of a display region excluding the captured image data and the inclination angle display information, and a color within the inclination angle display information as the display method.

6. The vehicle control apparatus according to claim 1, wherein the display device displays the output image data outputted from the output portion, the display device displaying an icon warning a driver with the output image data as the display method.

7. The vehicle control apparatus according to claim 1, wherein the display device displays the output image data outputted from the output portion, the display device displaying the output image data that changes a color at a region within the captured image data in accordance with a difference in height relative to a lateral plane as the display method.

8. A vehicle control apparatus comprising:
a first acquisition portion acquiring captured image data outputted from an imaging portion that is provided at a vehicle and that images a surrounding area of the vehicle;
a second acquisition portion acquiring an inclination angle of the vehicle on a basis of state information of the vehicle, the state information outputted from a vehicle state detection portion that is provided at the vehicle; and
an output portion being configured to output output image data to a display device, the output image data including the captured image data and an inclination angle display information indicating the inclination angle of the vehicle, the output portion changing a display method within the output image data in accordance with the inclination angle of the vehicle and outputting the output image data,
wherein the display device displays the output image data outputted from the output portion, the display device displaying the output image data that changes a color at a region within the captured image data in accordance with a difference in height relative to a lateral plane as the display method.

9. The vehicle control apparatus according to claim 8, wherein the output portion changes a color in accordance with the inclination angle of the vehicle as the display method within the output image data.

10. The vehicle control apparatus according to claim 8, wherein the output portion outputs the output image data including the captured image data that is rotationally controlled on a basis of the inclination angle of the vehicle relative to a lateral direction, the lateral direction that is a direction included in a lateral plane orthogonal to a direction of gravity, by using inclination angle data of the vehicle, the inclination angle data acquired by the second acquiring portion.

11. The vehicle control apparatus according to claim 8, wherein
the output portion outputs the output image data including the captured image data when the inclination angle of the vehicle is less than a predetermined first angle;
the output portion outputs the output image data including the captured image data and the inclination angle display information when the inclination angle of the vehicle is equal to or greater than the first angle; and
the output portion outputs the output image data including the captured image data and the inclination angle display information and changes the display method within a display region of the output image data when the inclination angle of the vehicle is equal to or greater than a predetermined second angle that is greater than the first angle.

12. The vehicle control apparatus according to claim 8, wherein
the inclination angle includes a first inclination angle of the vehicle, the first inclination angle serving as a roll angle, and a second inclination angle of the vehicle, the second inclination angle serving as a pitch angle;
the display method includes a first display method and a second display method;
the output portion changes the first display method within a display region of the output image data in accordance with the roll angle; and
the output portion changes the second display method within the display region of the output image data in accordance with the pitch angle.

13. The vehicle control apparatus according to claim 8, wherein the output portion changes at least one of a color of the captured image data, a color of a display region excluding the captured image data and the inclination angle display information, and a color within the inclination angle display information as the display method.

14. The vehicle control apparatus according to claim 8, wherein the display device displays the output image data outputted from the output portion, the display device displaying an icon warning a driver with the output image data as the display method.

15. A vehicle control apparatus comprising:
a first acquisition portion acquiring captured image data outputted from an imaging portion that is provided at a vehicle and that images a surrounding area of the vehicle;
a second acquisition portion acquiring an inclination angle of the vehicle on a basis of state information of the vehicle, the state information outputted from a vehicle state detection portion that is provided at the vehicle; and
an output portion being configured to output output image data to a display device, the output image data including the captured image data and inclination angle display information indicating the inclination angle of the vehicle, the output portion changing a display method within the output image data in accordance with the inclination angle of the vehicle and outputting the output image data,
wherein the inclination angle display information is displayed as an icon representing a current inclination angle of the vehicle, and
the output portion outputs the output image data including the captured image data that is rotationally controlled on a basis of the inclination angle of the vehicle relative to a lateral direction, the lateral direction is a direction included in a lateral plane orthogonal to a direction of gravity, by using inclination angle data of the vehicle, the inclination angle data is acquired by the second acquiring portion,
wherein a control portion is configured to perform the rotation control on the captured image data depending on a roll angle in a manner that a horizontal line included in a subject captured in the captured image data is substantially parallel to a lateral-direction side of a display device, the angle indicating an inclination around a front-rear axis of the vehicle calculated from acceleration data, and
the control portion is configured to correct an inclination of the captured image data by rotating the captured image data about a position coordinate set within the captured image data.

* * * * *